MOORE & WENDELL.
Plow and Harrow.

No. 95,925.

Patented Oct. 19, 1869.

Witnesses:

Inventors:
A. Moore
F. Wendell
per: Attys.

United States Patent Office.

ALBERT MOORE AND FRIEDERICH WENDEL, OF CHILLICOTHE, OHIO.

Letters Patent No. 95,925, dated October 19, 1869.

IMPROVEMENT IN COMBINED PLOW AND HARROW.

The Schedule referred to in these Letters Patent and making part of the same.

*To all whom it may concern:*

Be it known that we, ALBERT MOORE and FRIEDERICH WENDEL, of Chillicothe, in the county of Ross, and State of Ohio, have invented a new and useful Improvement in Combined Plow and Harrow; and we do hereby declare that the following is a full, clear, and exact description thereof, which will enable others skilled in the art to make and use the same, reference being had to the accompanying drawings, forming part of this specification, in which—

Figure 1:
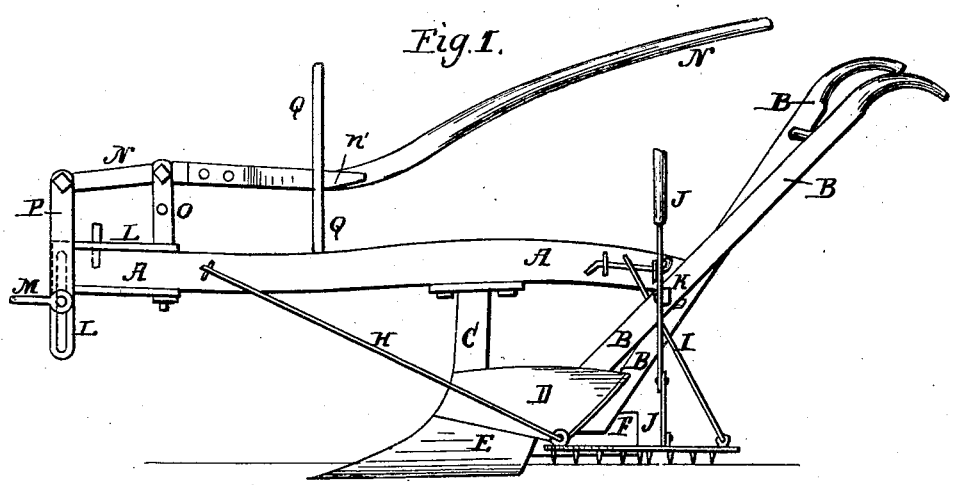
Figure 2:
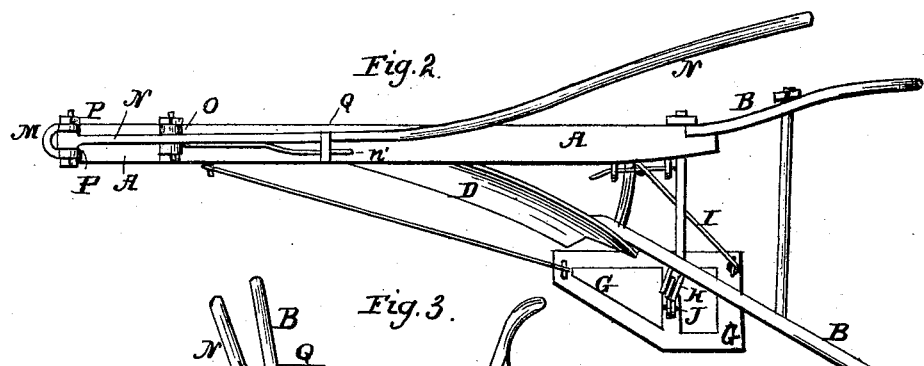
Figure 3:
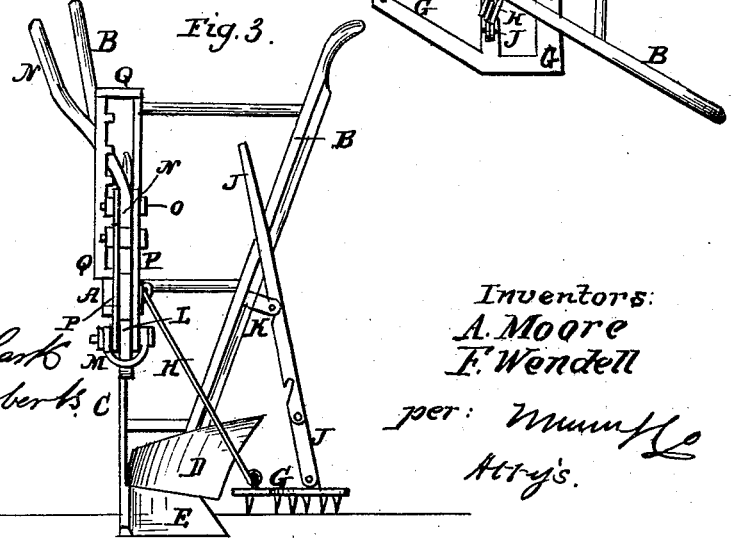

Figure 1 is a side view of our improved plow.
Figure 2 is a top view of the same.
Figure 3 is a front view of the same.

Similar letters of reference indicate corresponding parts.

Our invention has for its object to improve the construction of plows, so as to make them more convenient and effective in operation, enabling them to harrow the furrow as it is turned, and enabling them to be adjusted to run deeper or shallower in the ground even when at work; and It consists in the construction and combination of the various parts, as hereinafter more fully described.

A represents the plow-beam; B, the handles; C, the standard; D, the mould-board; E, the point; and F, the landside; about the construction of which parts there is nothing new.

G is a small harrow-frame, to which the harrow-teeth are attached.

H is the draught-rod, the forward end of which is pivoted to the side of the forward part of the beam A, by means of a staple or eye-bolt, and the rear end of which is pivoted to the forward end of the harrow-frame G.

I is a rod, the upper or forward end of which is pivoted to the side of the rear end of the beam A, by means of a bolt passing through eye-bolts or staples attached to said beam, and through an eye formed in the end of the said rod. The rear or lower end of the rod I is pivoted to the rear part of the harrow G, near its inner edge.

J is a jointed rod, the lower end of which is pivoted to the middle part of the frame G.

The inner edge of the upper part of the jointed rod or bar J has notches formed in it, which catch upon the pin in the slotted end of the short arm K, attached to the side of the mould-board handle, as shown in figs. 1, 2, and 3, so that the harrow may be turned up, and suspended clear of the ground when desired, or secured in working-position, to harrow the furrow as it is turned by the plow.

L is the large clevis, which is secured to the forward end of the plow-beam in the ordinary manner.

The forward end or loop of the clevis L is extended downward, and is slotted vertically, to receive the bolt of the small clevis M, to which the draught is attached.

N is a lever, the rear end of which extends back into such a position that it can be conveniently reached and operated by the driver.

The lever N is pivoted to the slotted upper end of the rear clevis-bolt O, or to some other support attached to the plow-beam A.

The pivoting-point or fulcrum of the lever N should be about eight inches from the forward end of the beam A, and about three inches above said beam. The forward end of the lever N extends a little beyond the forward end of the beam A, and to it are pivoted the upper ends of the two short bars P, which pass down upon each side of the slotted forward end or loop of the clevis L; and through a hole in their lower ends the bolt of the small clevis M, passes, so that by operating the lever N, the draught-point may be raised and lowered at will, to regulate the depth at which the plow runs in the ground, even when the plow is at work.

Q is an upright arm or standard attached to the upper side of the plow-beam A. The standard Q is slotted longitudinally, for the passage of the lever N, and in said standard, upon one side of the said slot, are formed notches or teeth, to hold the said lever N securely in any position into which it may be adjusted.

The lever N is held against the notched or toothed side of the standard Q by the spring $n'$ attached to said lever, and which presses against the other or smooth side of said slot.

The large clevis L may be adjusted, to cause the plow to cut a wider or narrower furrow, by shifting the position of the forward clevis-pin or bolt in the ordinary manner.

Having thus described our invention,

We claim as new, and desire to secure by Letters Patent—

The combination of the harrow G, draught-rods H and I, and jointed catch-rod J, with the plow A B C D E F, substantially as herein shown and described, and for the purpose set forth.

ALBERT MOORE.
FRIEDERICH WENDEL.

Witnesses:
CHAS. S. MICK,
E. K. MICK.